(12) United States Patent
Grosspietsch et al.

(10) Patent No.: US 8,602,192 B2
(45) Date of Patent: Dec. 10, 2013

(54) MULTIPLE-DISK CLUTCH WITH RESILIENT ELEMENT

(75) Inventors: Wolfgang Grosspietsch, Schweinfurt (DE); Angelika Ebert, Schonungen (DE); Daniel Pittner, Gerbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 529 days.

(21) Appl. No.: 12/882,768

(22) Filed: Sep. 15, 2010

(65) Prior Publication Data

US 2011/0061984 A1 Mar. 17, 2011

(30) Foreign Application Priority Data

Sep. 16, 2009 (EP) .................................... 09170396

(51) Int. Cl.
*F16D 25/0638* (2006.01)
(52) U.S. Cl.
USPC .................. 192/85.34; 192/109 A; 192/109 F
(58) Field of Classification Search
USPC .......... 192/85.34, 109 A, 109 F, 85.24, 85.42
See application file for complete search history.

(56) References Cited

U.S. PATENT DOCUMENTS

| | | | |
|---|---|---|---|
| 4,623,055 A | | 11/1986 | Ohkubo |
| 4,949,829 A | * | 8/1990 | Tojima et al. .............. 192/89.23 |
| 5,335,763 A | | 8/1994 | Katoh |
| 5,967,283 A | * | 10/1999 | Kemper ...................... 192/89.23 |
| 2006/0169565 A1 | * | 8/2006 | Ichikawa .................. 192/85 AA |
| 2006/0201772 A1 | * | 9/2006 | Kinpara ..................... 192/85 AA |
| 2007/0256557 A1 | * | 11/2007 | Hamaya et al. ................... 92/193 |
| 2007/0261932 A1 | * | 11/2007 | Zagrodzki et al. .......... 192/70.27 |
| 2009/0057087 A1 | | 3/2009 | Oh |

FOREIGN PATENT DOCUMENTS

| | | |
|---|---|---|
| DE | 195 30 443 | 10/1996 |
| DE | 102 55 537 | 6/2004 |
| DE | 10 2007 05674 | 3/2009 |
| DE | 10 2008 00891 | 8/2009 |
| EP | 1 577 575 | 9/2005 |
| EP | 1 798 435 | 6/2007 |
| GB | 2 149 863 | 6/1985 |
| JP | 59 155627 | 9/1984 |
| JP | 2002 213581 | 7/2002 |
| JP | 2003 247564 | 9/2003 |

* cited by examiner

*Primary Examiner* — David D Le
*Assistant Examiner* — Steven B Christ
(74) *Attorney, Agent, or Firm* — Cozen O'Connor

(57) ABSTRACT

Multiple-disk clutch with outer disks supported by an outer disk carrier that is rotatable around an axis of rotation and with inner disks supported by an inner disk carrier that is rotatable around the axis of rotation. The outer disks and the inner disks form an annular disk stack with an inner radius and an outer radius. An axially movable actuator actuates the disk stack. The actuator engages in a central radius area of the disk stack with reference to the axis of rotation when actuating. The disk stack includes a resilient element.

14 Claims, 8 Drawing Sheets

MULTIPLE-DISK CLUTCH WITH RESILIENT ELEMENT

BACKGROUND OF THE INVENTION

1. Field of the Invention

The invention is directed to a multiple-disk clutch in a drivetrain of a motor vehicle.

2. Description of the Related Art

Multiple-disk clutches of this kind are known. The multiple-disk clutches usually have an outer disk carrier with a spline profile at which outer disks are arranged so as to be fixed with respect to rotation relative to it and axially displaceable and an inner disk carrier with a spline profile at which inner disks are arranged fixed with respect to rotation relative to it and axially displaceable. The outer disks and inner disks are arranged in an alternating manner to form a disk stack. To transmit torque, the disk stack is pressed together by an actuator so that the disks are brought into frictional engagement. The disks can be constructed as steel plates and as faced disks. When actuated, one side of a disk, which has a facing, is always brought into frictional engagement with an adjacent disk which does not have a facing.

The actuator can be constructed as a hydraulically actuated piston. When a multiple-disk clutch of this kind is used as a starting clutch, the torque transmission behavior of the clutch is especially sensitive to torque fluctuations particularly at the beginning of torque transmission in the low torque range. These torque fluctuations have a disproportionately strong impact when the excitation occurring at the rate of rotation of the slipping clutch meets the resonant frequency of the drivetrain. Accordingly, variations in the thickness of individual disks can cause torque fluctuations in the torque transmitted by the clutch which can be transferred to the entire succeeding drivetrain and can lead to jerking of the vehicle or to shaking during starting.

It is known from DE 102 55 537 to arrange resilient springing washers inside the disk stack. Further, it is known from DE 195 30 443 to arrange a disk spring between the piston and the disk stack. Further, it is known from EP 1 577 575 to construct an end disk of a disk stack in such a way that a pressing distribution which is as uniform as possible is achieved when there are high pressing forces.

Fluctuations of the transmitted torque occur when the two sides of the clutch rotate at different speeds such as when starting, for example and the pressing pressure fluctuates due to variations in the thickness of individual disks. The torque always increases when an elevation in a disk passes an elevation in another disk rotating at a different speed, or when the piston or opposite support of the disk stack is in a skewed position and the elevation in a disk passes the narrow point defined by the piston or opposite support. The known springing elements in the disk stack serve to impart an elasticity to the disk stack that can absorb irregularities in torque due to variations in the thickness of individual disks.

However, the known solutions have the disadvantage that the springing elements only make contact in an edge area of the adjacent disk and, therefore, an uneven pressing distribution is introduced into the disk stack. While this unevenness is still not critical when relatively low torques are transmitted such as when starting to move, it is not negligible. In order to optimize the pressing distribution at higher pressing pressures, the springing elements are lightly designed such that the resilient element is pressed flat against the adjacent disk at higher pressing pressures. When the disk stack is actuated by the actuator, the force application radius acting on the disk adjacent to the resilient element shifts gradually from the edge area toward the radial center of the disk stack.

SUMMARY OF THE INVENTION

Based on the prior art cited above, an object of the invention is to provide a multiple-disk clutch which has an improved application of force and, therefore, a better pressing distribution.

According to one embodiment of the invention, the resilient element is constructed such that when the disk stack is actuated a resilient element contacts a second edge area of an adjacent disk stack opposite a first edge area, and the resilient element does not contact the adjacent disk in the central edge area. When the first edge area of the resilient element contacts the adjacent disk on the radially outer side, the second edge area, i.e., the radially inner area, is made to contact when actuated without the radially central area coming into contact. When the first edge area of the resilient element contacts the adjacent disk on the radially inner side, the second edge area, i.e., the radially outer area, is made to contact when actuated without the radially central area coming into contact.

In this regard, it is advantageous that when the multiple-disk clutch is actuated the resilient element does not contact the adjacent disk proceeding from the first contacting edge area continuously along the center to the opposite edge area, but rather when the multiple-disk clutch is actuated the second edge area initially contacts the adjacent disk, and the resilient element does not contact the adjacent disk in the central edge area. Whereas in the prior art an application of force to the second edge area does not take place until the resilient element fully contacts the adjacent disk and, therefore, not until the end of the spring travel of the resilient element, an application of force to the second edge area takes place in the invention already much sooner and, therefore, while still in the springing range of the resilient element. Accordingly, the mean force application radius on the disk adjacent to the resilient element is not displaced continuously toward the radial center of the disk stack and only reaches the force application radius of the actuator substantially at the end of the spring travel of the resilient element. According to one embodiment of the invention, the mean force application radius is reached when the resilient element contacts the second edge area of the adjacent disk and then remains substantially constant over the rest of the spring travel.

In a particularly advantageous construction of the resilient element, the curve of the force application radius in the springing range of the resilient element has a step, while the force curve in the springing range is substantially linear. In this connection, it is advantageous that an advantageous control of the multiple-disk clutch is made possible by the linear force curve. Further, there is a smooth transition of the force curve from the springing range to the non-springing range when the resilient element contacts in a virtually flat manner.

In one embodiment of the invention, the resilient element is formed as an outer disk and is supported by a spline profile in the outer disk carrier. This ensures a radial guiding of the resilient element and, further, the resilient element can no longer rotate relative to the adjacent disk. This requires that both the resilient element and the adjacent disk are constructed as outer disks or as inner disks.

The resilient element is preferably constructed such that the resilient element has a first area and a second area that is axially offset from the first area by a step, the first area contacts the adjacent disk when the multiple-disk clutch is inactive, and the ratio of the first area to the second area is between 1/7 and 3/7.

According to one embodiment of the invention, the first area corresponds to the first contacting edge area, while the second edge area forms a part of the second area. In the preferred construction of the resilient element as an outer disk, the first area and the second area are defined such that the first area and second area, taken together, form the entire radial extension of the resilient element and the spline area is accordingly associated either with the first area or with the second area. Since the spline area is the radially outer edge area when this is an outer disk, torque is transmitted by it when contacting the spline area of the adjacent outer disk.

The ratio of the first area to the second area ensures that when the multiple-disk clutch is actuated the transmitted torque during starting, which is much smaller than the maximum transmissible torque, the surfaces of the first and second edge area of the resilient element which contact the adjacent disk are substantially identical.

In another preferred embodiment of the invention, the axial step corresponds to between 10% and 90%, preferably between 10% and 50%, of the thickness of the first area. In this connection, it is advantageous that the step can be stamped in the outer disk, which is preferably made of plate steel, and that the first area is axially offset from the second area by no more than the axial thickness in this area. Further, manufacturing tolerances are easier to keep under control in a step than in a plate spring. The second area of the resilient element preferably lies in a plane which is parallel to the first area and which is offset by the axial step. However, it may also be advantageous when, in addition to the step, the second area has an angle of preferably between 1° and 10°, most preferably between 1° and 5°, relative to the first area so that the second area slopes away from the adjacent disk and the second edge area is accordingly at a greater distance from the adjacent disk than only the height of the axial step. The combination of the step and the taper of the resilient element is advantageous in that the elasticity of the element can be adjusted and optimized during production by the step and the taper.

The axial thickness is preferably identical in the first area and second area so that the resilient element can be fabricated from a flat disk. However, it is also possible, according to one embodiment of the invention, that the thickness of the first area is greater than that of the offset second area by the axial step.

In a preferred arrangement of the resilient element in the disk stack, the resilient element is arranged between the actuator and the first adjacent outer disk.

The axial oscillating capacity of the disk stack is advantageously reduced. Axial oscillations which would be transmitted from the actuator to the disk stack are reduced by the resilient element arranged between the actuator and the disk stack. In this way, the torque fluctuations due to variations in the thickness of the disks and the torque fluctuations due to axial oscillations or variations in the pressing force of the actuator are filtered out. The mass of the disk stack is supported at the opposite fixed axial stop and is accordingly decoupled from the oscillatable system.

However, when the disk stack directly contacts the actuator and the resilient element is arranged at the opposite end of the disk stack, the torque fluctuations due to variations in the thickness of the disks are filtered out, but the mass of the disk stack presents an oscillatable system that can be excited by axial oscillations of the actuator.

In a particularly preferred construction of the actuator, the actuator acts on the central radius area of the resilient element by a spherical contact surface. In this connection, it is advantageous when the actuator acts on the area of the resilient element which does not yet contact the adjacent disk, and which therefore still acts in a springing manner, when the first edge area and second edge area make contact.

Since the resilient element according to the invention makes a tilting movement around the point of contact of the actuator when the multiple-disk clutch is actuated, the spherical contact surface ensures that the contact point of the resilient element can roll on the actuator without tilting along an edge. The actuator preferably engages by an end face at the elastic disk whose radial extension corresponds approximately to the thickness of the disks. The end face of the actuator can be rounded or roof-shaped.

In an alternative or additional construction of the invention, the resilient element is arranged on the side of the disk stack axially opposite the actuator between the final outer disk of the disk stack and an axial stop which supports the resilient element axially. The axial stop preferably acts on the central radius area of the resilient element. In this regard, as in the arrangement of the resilient element on the actuator side, the force application radius or force-supporting radius lies in the central radius area which is still at a distance from the adjacent disk, and accordingly still acts in a spring manner, when the first and second edge areas make contact.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in the following with reference to drawings.

In the drawings.

DETAILED DESCRIPTION OF THE PRESENTLY PREFERRED EMBODIMENTS

Figure 1:
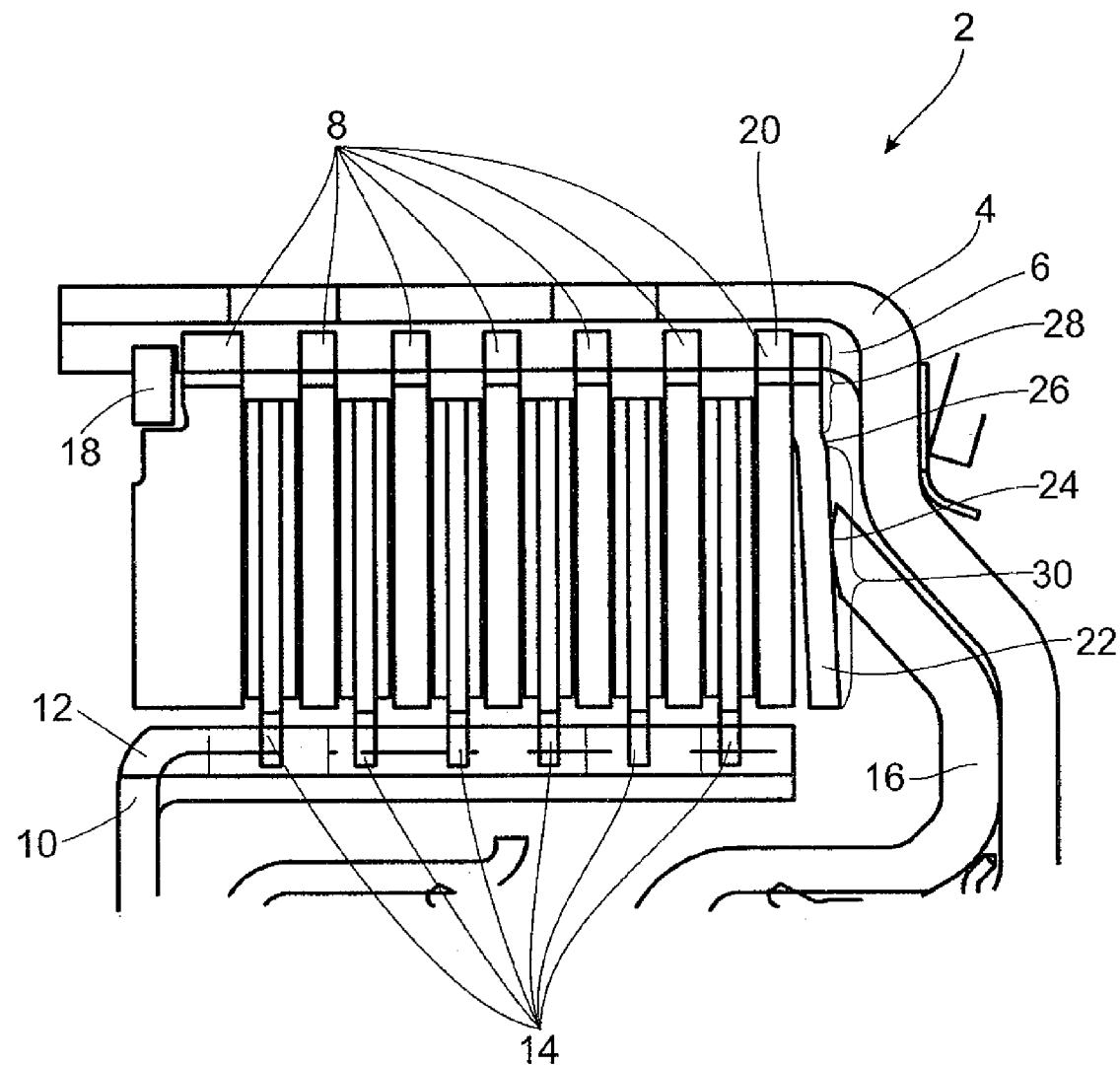
FIG. 1 is a first multiple-disk clutch according to the invention in the inactive state.

FIG. 1 shows a multiple-disk clutch 2 with an outer disk carrier 4 which has, at the inner circumferential surface, a spline profile 6 in which the outer disks 8 are arranged so as to be fixed with respect to rotation relative to it but so as to be displaceable axially. The inner disk carrier 10 has, at the outer circumferential surface, a spline profile 12 in which the inner disks 14 are arranged so as to be fixed with respect to rotation relative to it but so as to be displaceable axially. The inner disks 14 are constructed in this instance as faced disks and the outer disks 8 are constructed as steel disks. However, the reverse could also be possible. The actuator 16 is constructed as an axially displaceable piston. The disk stack is supported axially by an axial securing device in the form of a snap ring 18, which is held in a groove in the outer disk carrier 4. The end disk supported at the snap ring 18 is thicker than the other outer disks 8 to prevent bending. A resilient element 22 is arranged between the actuator 16 and the first outer disk 20. Like the outer disks, the axially resilient element 22 is held in the spline profile 6 of the outer disk carrier 4. To this end, the resilient element 22 has a corresponding spline profile at the outer circumference.

The resilient element 22 contacts the adjacent outer disk 20 preferably in the radially outer edge area. The actuator contacts the central radius area of the resilient element 22 by a spherical end face 24. The resilient element 22 has an axial step 26 which limits the contacting first edge area 28. The step separates the first area corresponding to the first edge area 28 from the second area 30 which is located opposite the first area 28.

Figure 2:
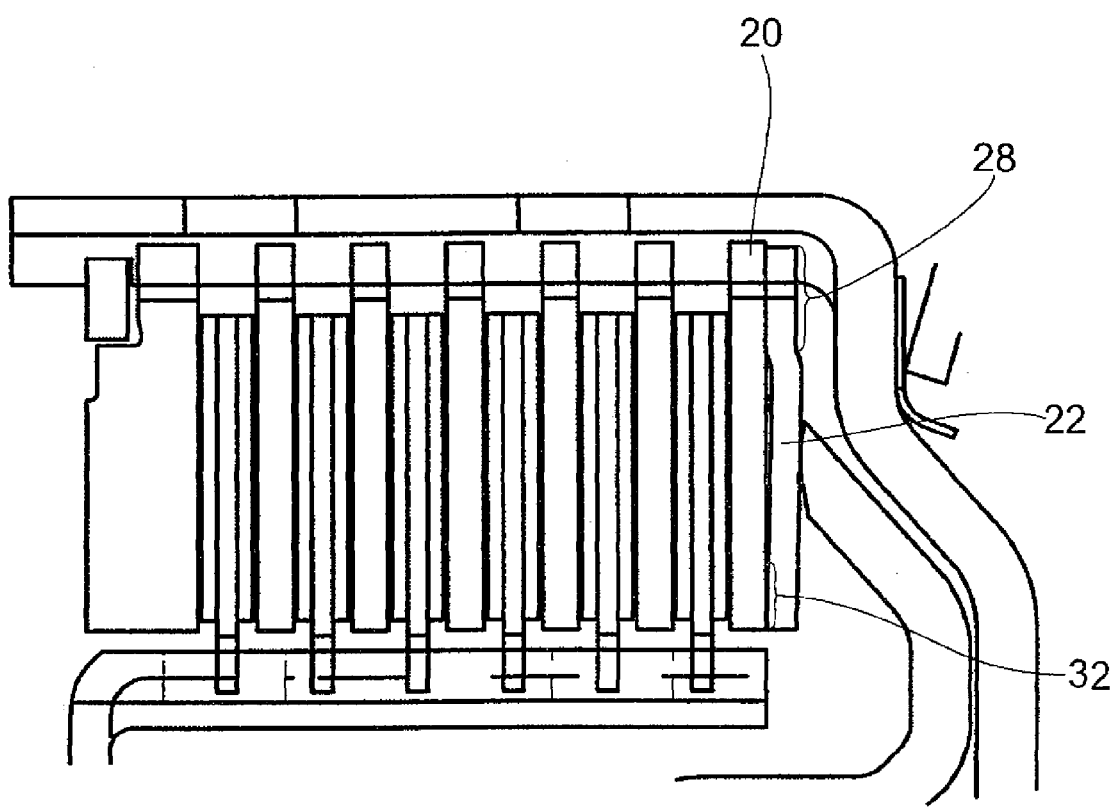
FIG. 2 is the first multiple-disk clutch according to the invention in the actuated state.

FIG. 2 shows the multiple-disk clutch from FIG. 1 in its actuated state. The actuation state corresponds to a torque transmission capacity in the range of about 20 Nm to 50 Nm and is run through when starting. The resilient element 22 is pressed against the adjacent disk 20 against its spring force by the actuator 16 so that the second, radially inner edge area 32 comes into contact with the disk 20. The resilient element 22 now lies in an area radially outside the first edge area 28 and radially inside the second edge area 32 at the adjacent disk 20. The central radius area of the resilient element 22 acted upon by the actuator 16 does not contact the adjacent disk 20 and can accordingly still spring relative to the contact point of the actuator.

Figure 3:
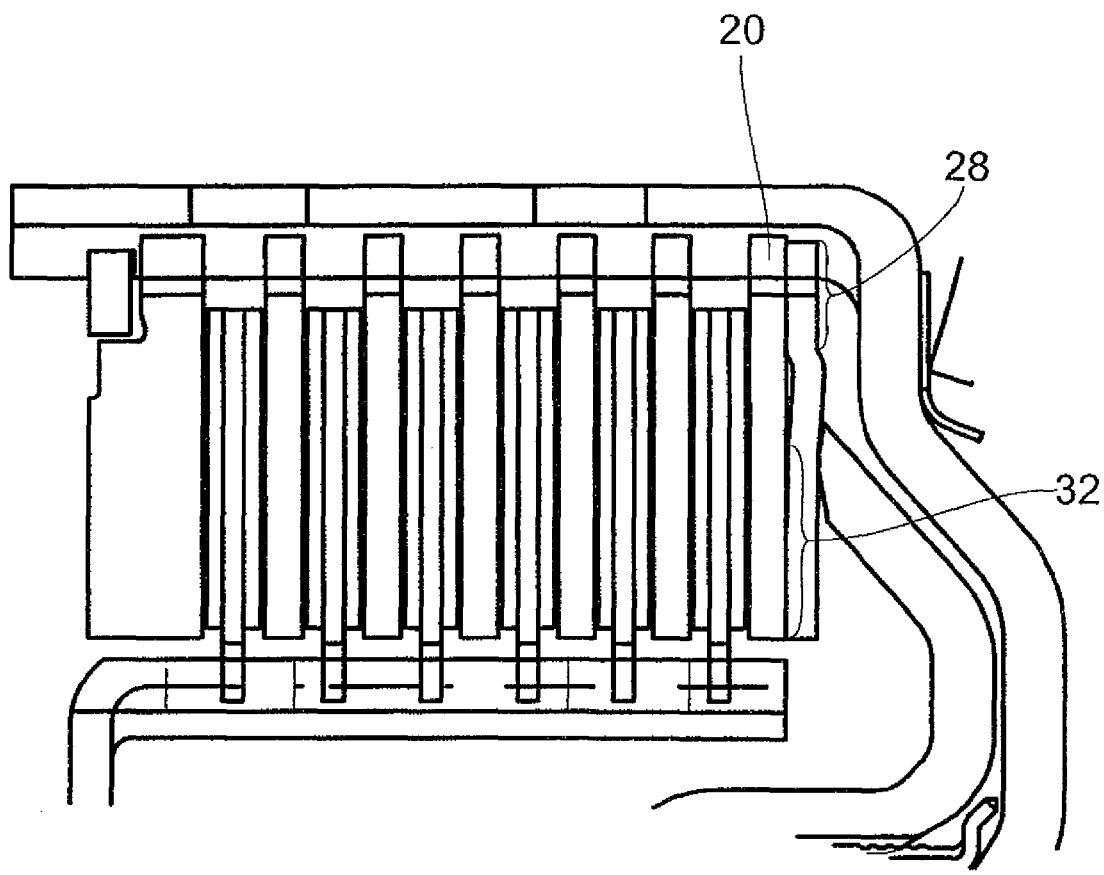
FIG. 3 is the first multiple-disk clutch according to the invention at rated pressing force.

FIG. 3 is the multiple-disk clutch of FIGS. 1 and 2 but at the rated pressing force of the actuator 16. The second edge area 32 that which contacts the adjacent disk 20 is greatly enlarged toward the radially outer side, while the first edge area 28 remains substantially constant. In the area of the step 26, the resilient element 22 still does not contact the adjacent disk 20.

Figure 4:
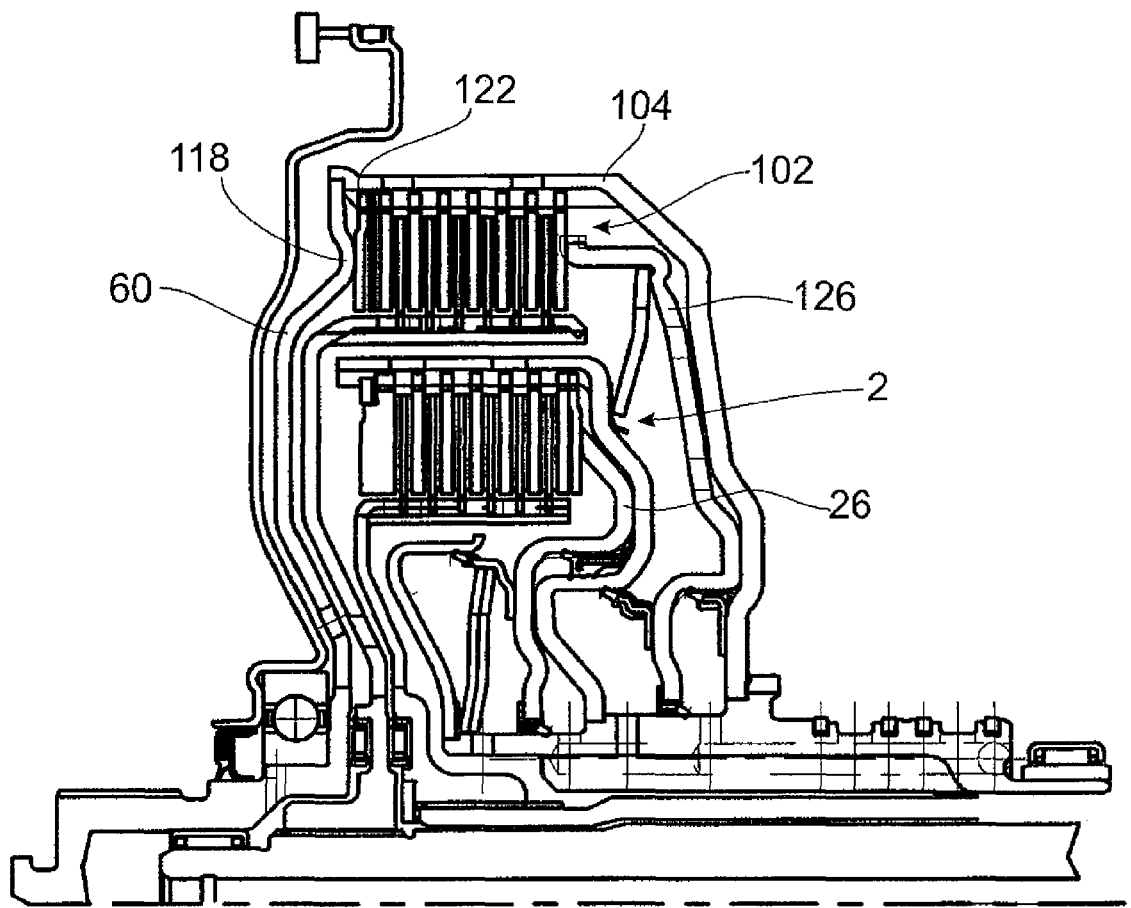
FIG. 4 is a dual-clutch arrangement with two multiple-disk clutches according to the invention.

FIG. 4 is a wet dual-clutch arrangement with two multiple-disk clutches 2, 102. The radially inner multiple-disk clutch 2 corresponds to the multiple-disk clutch from FIGS. 1 to 3. The actuators 26, 126 are constructed as hydraulically actuated pistons. The axial stop 118 of the radially outer multiple-disk clutch is constructed as a circumferential bend in the driver 60 which is welded to the outer disk carrier 104. Torque is transmitted from the drive unit to the two multiple-disk clutches 102, 2 by the driver 60.

The resilient element 122 is arranged at the side of the disk stack opposite the piston 126 between the axial support 118 and the end disk of the disk stack. The axial support 118 acts on the central radius area of the resilient element which initially does not come into contact with the end disk when actuated.

Figure 5:
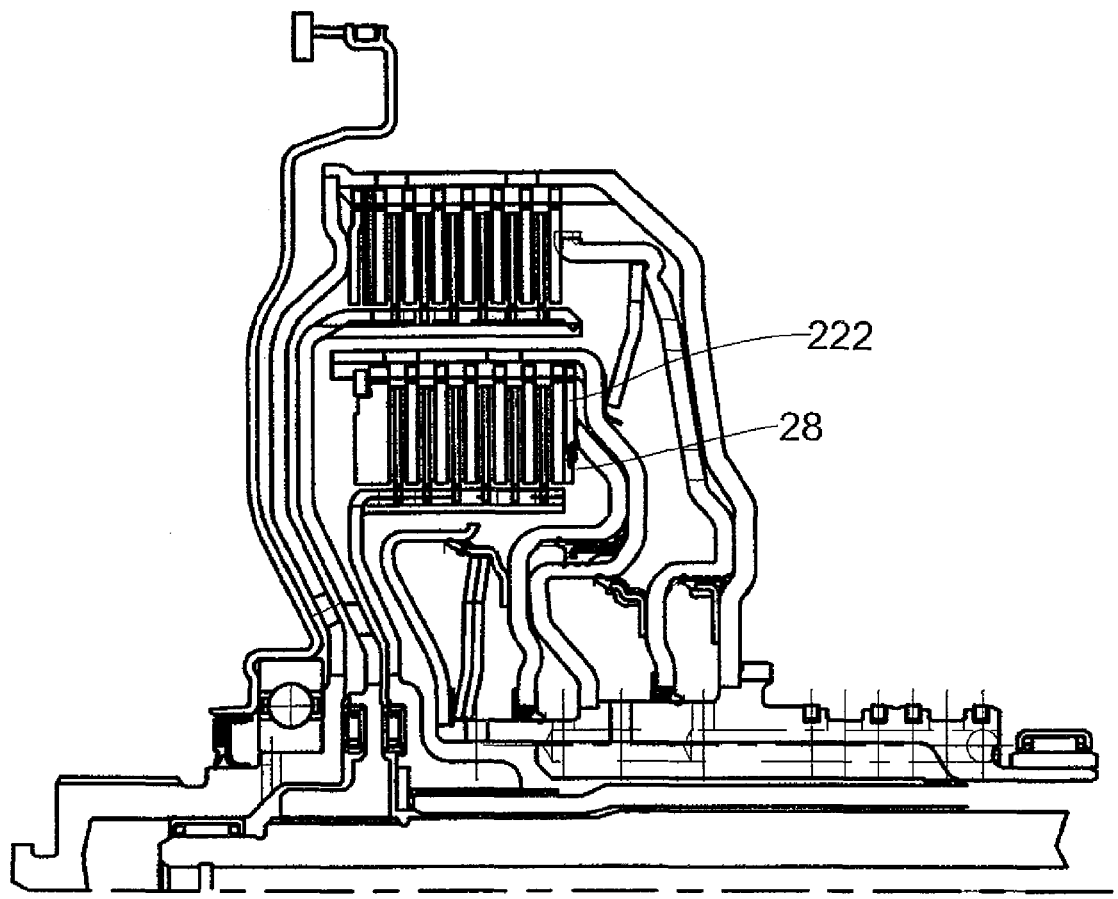
FIG. 5 is an alternative dual-clutch arrangement.

The dual clutch arrangement in FIG. 5 corresponds to the dual clutch arrangement in FIG. 4 with the exception of resilient element 222. The resilient element 222 is constructed as an outer disk, but contacting first edge area 28 is formed on the radially inner side and the second, axially offset area which is at a distance axially from the adjacent disk extends toward the radially outer side up to the spline area. The functioning of the resilient element 222 is substantially identical to that of the resilient element 22, only in reverse. When the multiple-disk clutch 2 is actuated, the radially outer edge area is brought into contact with the adjacent disk.

Figure 6:
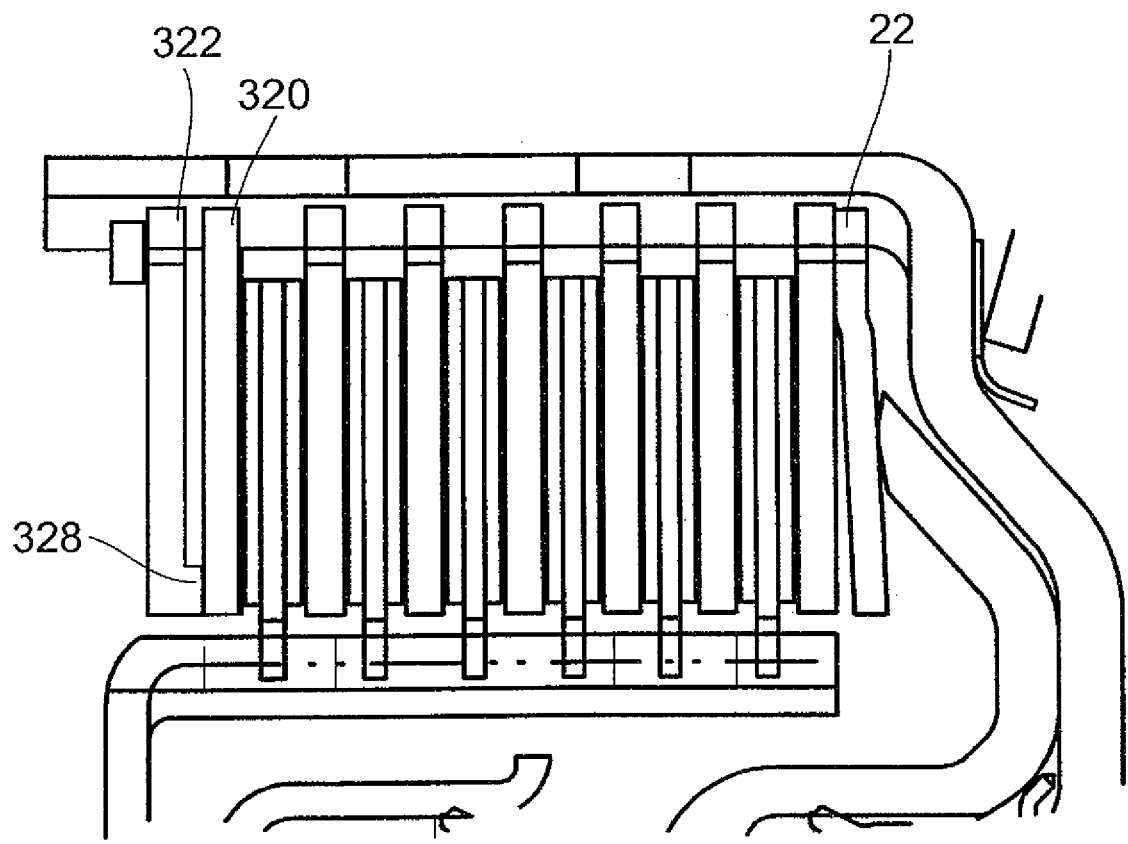
FIG. 6 is a second multiple-disk clutch according to the invention in the inactive state.

FIG. 6 is an alternative multiple-disk clutch in the inactive state which, in addition to the resilient element 22, has a second resilient element 322. The resilient element 322 contacts the end outer disk 320 by first, radially inner edge area 328. In contrast to the resilient element 22 which has substantially the same thickness over the entire radial extension, the resilient element 322 is thicker in the first edge area 328. In the inactive state, the resilient element 22 contacts the adjacent disk on the radially outer side and the resilient element 322 contacts the adjacent disk 320 on the radially inner side.

Figure 7:
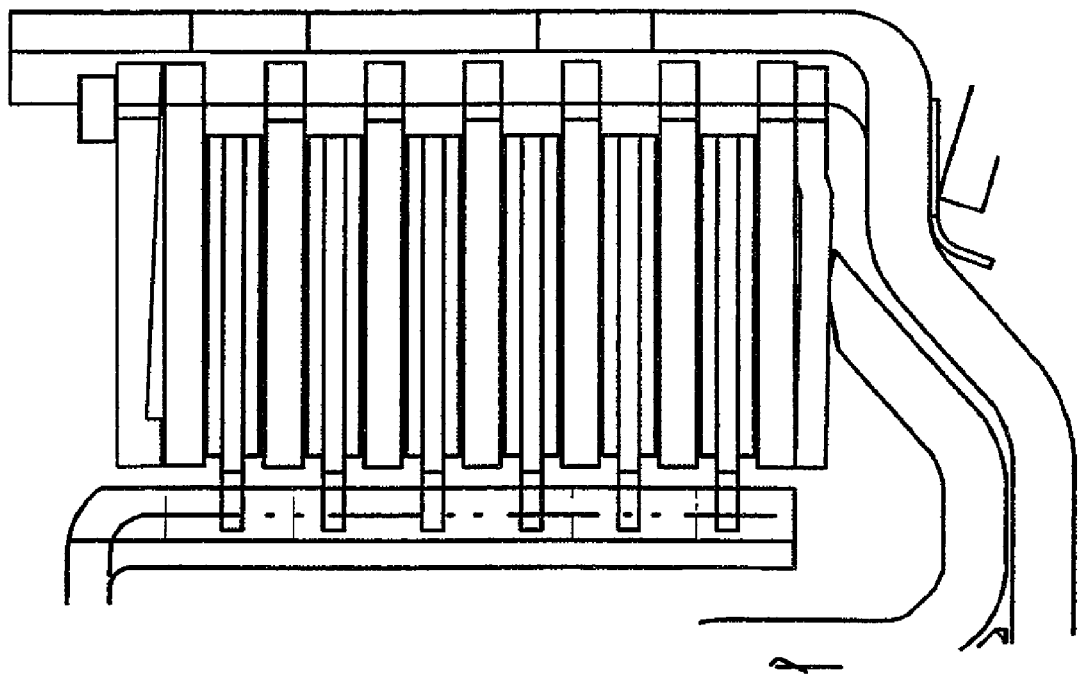
FIG. 7 is a second multiple-disk clutch according to the invention in the actuated state.

FIG. 7 shows the multiple-disk clutch from FIG. 6 in its actuated state. The resilient elements 22, 322 are swiveled toward the left-hand side against their spring force. Accordingly, both the first edge area and the second edge area of both resilient elements 22, 322 contact respective adjacent disks. It goes without saying that the multiple-disk clutch from FIGS. 6 and 7 preferably be constructed without the resilient element 22 and with only resilient element 322.

Figure 8A:
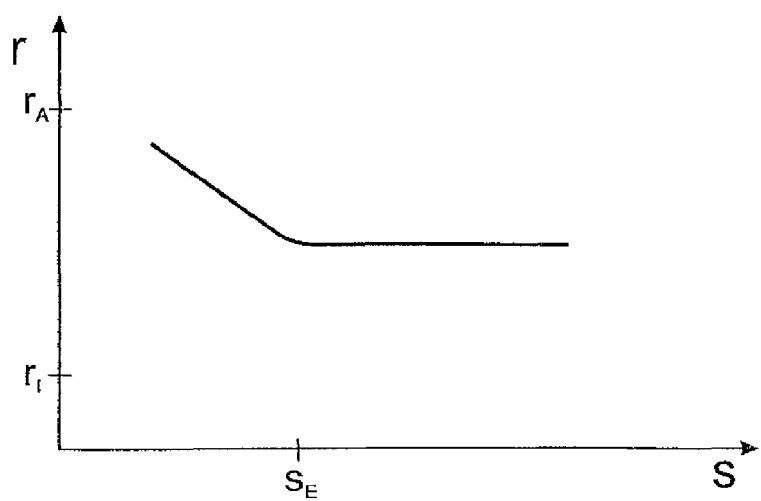
FIG. 8a is a curve of the force application radius of a multiple-disk clutch according to the prior art.
Figure 8B:
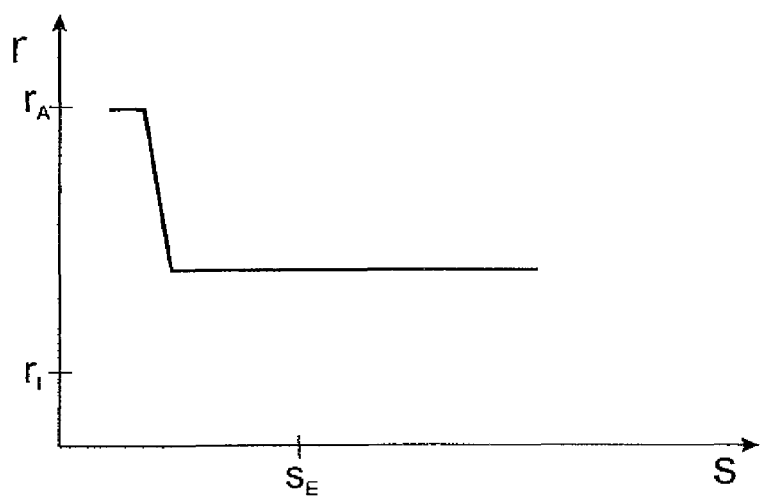
FIG. 8b is a curve of the force application radius of a multiple-disk clutch according to the invention.

FIGS. 8A and 8B compares the qualitative curve of the force application radius along the spring travel of a resilient element according to the prior art and according to the invention.

FIG. 8A shows the curve of the force application radius of a resilient element as is shown, for example, in U.S. Pat. No. 4,371,066.

By force application radius is the radius area in which a linear equivalent force would act on the disk adjacent to the resilient element. The resilient element transmits the actuating force of the actuator to the adjacent disk and, accordingly, to the entire disk stack. When the resilient element makes full contact with the adjacent disk, the force application radius lies in the central radius area of the resilient element. Since the contacting area of the resilient element from the prior art increases continuously from the radially outer side to the radially inner side, the force application radius runs continuously in a corresponding manner from the radially outer side to a central radius area. Accordingly, the radially central area is not reached until the end of the spring travel of the resilient element.

FIG. 8B shows the curve of the force application radius of the resilient element from FIGS. 1 to 3.

The curve of the force application radius of the resilient element according to the invention does not have a gradual transition along the spring travel of the resilient element to a central radius area of the resilient element, but rather a stepped transition from a radially outer area to a central area. Therefore, as a result, when the radially inner area of the resilient element contacts the adjacent disk, the force application radius immediately runs to a central area, although the end of the spring travel has not yet been reached.

In FIGS. 8A and 8B, the abscissa shows the spring travel of the resilient element and the ordinate shows the force application radius. In this case, rA corresponds to the outer radius of the resilient element and rI corresponds to the inner radius. The end of the spring travel of the resilient element is designated by SE.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A multiple-disk clutch comprising:
an outer disk carrier that is rotatable around an axis of rotation;
a plurality of outer disks supported by the outer disk carrier;
an inner disk carrier that is rotatable around the axis of rotation;
a plurality of inner disks supported by the inner disk carrier, an annular disk stack with an inner radius and an outer radius formed by the outer disks and the inner disks;
an axially movable actuator configured to actuate the disk stack, wherein the actuator engages a central radius area of the disk stack with respect to the axis of rotation; and
a resilient element of the disk stack that contacts its adjacent disk in an inactive state of the multiple-disk clutch in one of a first outer area of the disk stack and a first inner edge area of the disk stack constructed such that when the disk stack is actuated the resilient element initially contacts one of a second inner edge area of the disk stack and a second outer edge area of the disk stack located opposite from the first edge area on the adjacent disk,
wherein the resilient element does not contact the adjacent disk in the central radius area.

2. The multiple-disk clutch according to claim 1, wherein the resilient element is arranged as an outer disk supported by a spline profile.

3. The multiple-disk clutch according to claim 1, wherein the resilient element further comprises a first area and a second area which are axially offset from each other area by a step, the first area contacts the adjacent disk when the multiple-disk clutch is inactive, and a ratio of the first area to the second area is between 1/7 and 3/7.

4. The multiple-disk clutch according to claim 1, further comprising an axial step that corresponds to between 10% and 90% of a thickness of the first outer area.

5. The multiple-disk clutch according to claim 2, wherein the resilient element is arranged between the actuator and a first adjacent outer disk.

6. The multiple-disk clutch according to claim 5, wherein the actuator acts on the central radius area of the resilient element with a curved contact surface.

7. The multiple-disk clutch according to claim 2, wherein the resilient element is arranged on a side of the disk stack axially opposite the actuator between the final outer disk of the disk stack and an axial stop that supports the resilient element axially.

8. The multiple-disk clutch according to claim 7, wherein the axial stop acts on a central radius area of the resilient element.

9. The multiple-disk clutch according to claim 4, wherein the axial step corresponds to between 10% and 50% of the thickness of the first outer area.

10. A multiple-disk clutch comprising:
an outer disk carrier that is rotatable around an axis of rotation;
a plurality of outer disks supported by the outer disk carrier;
an inner disk carrier that is rotatable around the axis of rotation;
a plurality of inner disks supported by the inner disk carrier,
an annular disk stack with an inner radius and an outer radius formed by the outer disks and the inner disks;
an axially movable actuator configured to actuate the disk stack; and
a resilient element of the disk stack supported by the outer disk carrier and arranged between the axially movable actuator and a first outer disk of the disk stack comprising:
a first contact area arranged in contact the first outer disk;
a second contact area configured to be pressed against the first outer disk by the actuator; and
an axial step arranged between the first contact area and the second contact area configured to separate the second contact area from the first outer disk.

11. The multiple-disk clutch according to claim 10, wherein a ratio of the first area to the second area is between 1/7 and 3/7.

12. The multiple-disk clutch according to claim 10, wherein the axial step that corresponds to between about 10% and 90% of a thickness of a first outer area.

13. The multiple-disk clutch according to claim 12, wherein the axial step corresponds to between 10% and 50% of the thickness of a first outer area.

14. The multiple-disk clutch according to claim 10, wherein the actuator acts on the central radius area of the resilient element with a curved contact surface.

* * * * *